Nov. 15, 1932.  S. WEIN  1,887,531
PHOTOVOLTAIC CELL
Filed July 31, 1928  2 Sheets-Sheet 1
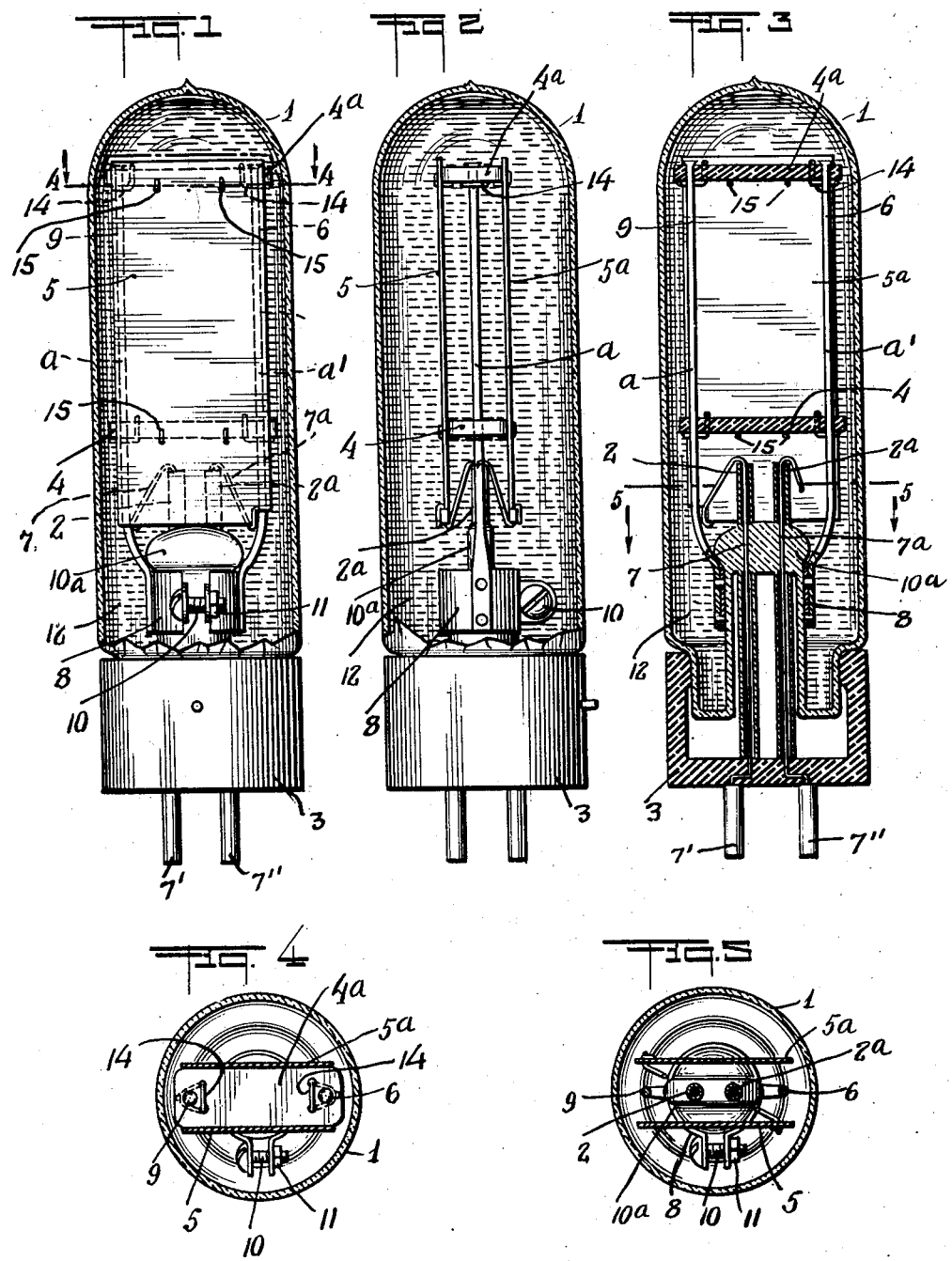
INVENTOR
Samuel Wein
BY
ATTORNEY

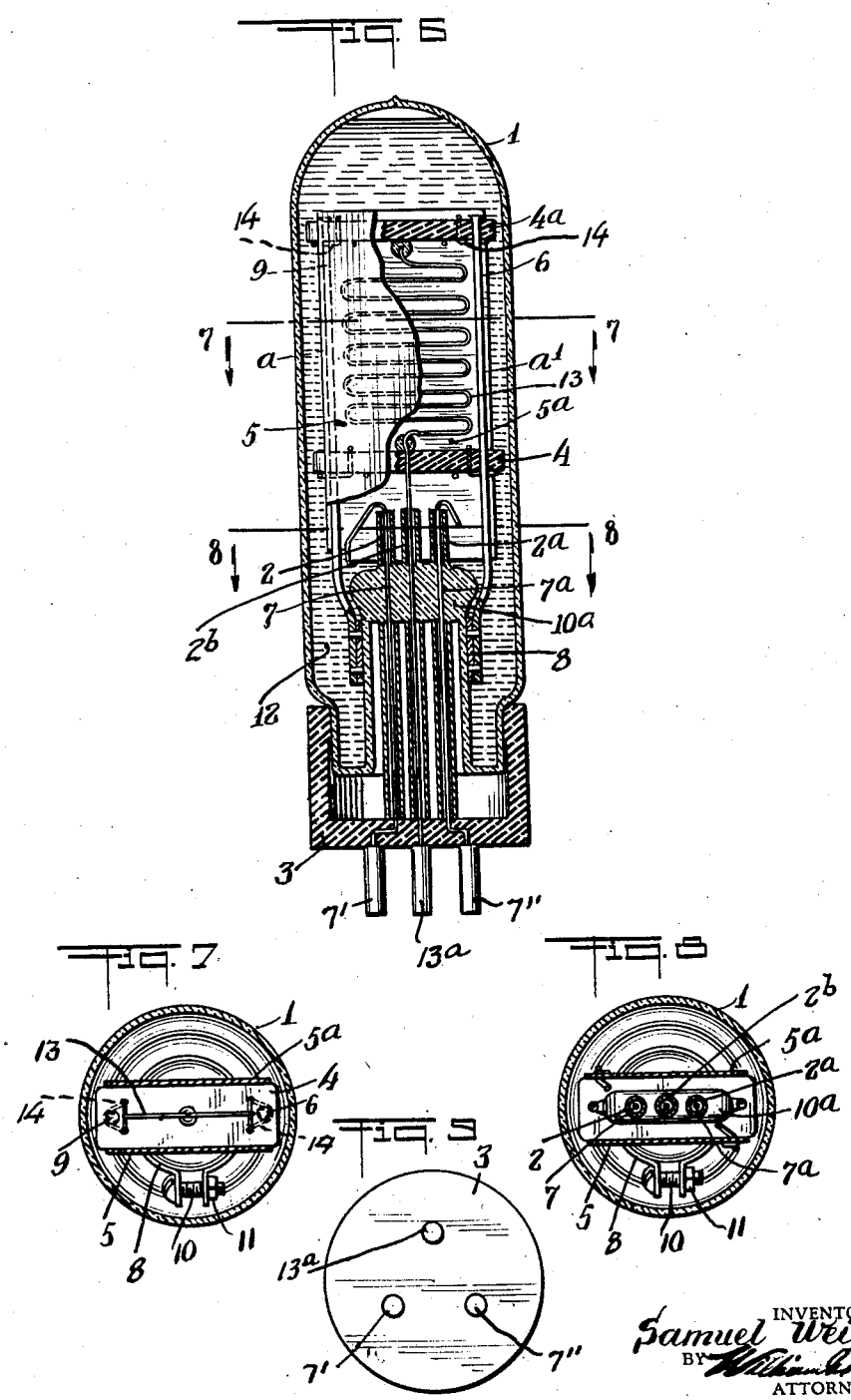

Patented Nov. 15, 1932

1,887,531

UNITED STATES PATENT OFFICE

SAMUEL WEIN, OF NEW YORK, N. Y., ASSIGNOR TO RADIOVISION CORPORATION, OF NEW YORK, N. Y., A CORPORATION OF NEW YORK

PHOTOVOLTAIC CELL

Application filed July 31, 1928. Serial No. 296,510.

My invention relates to improvements in electrical apparatus, and more particularly relates to an improved photo voltaic cell, and the method of making same. One of the objects of my invention is to produce a highly sensitive photo voltaic cell, one particularly efficient to the light radiations, and giving rise to greater potentials as a result of subjecting the new form of light sensitive cell to a source of light. Because of these features, my cell is particularly applicable to the various electrical devices in which a light sensitive cell is an integral part in its circuit, and specifically to the transmission of photographs, facsimiles and the like, and to so-called television systems wherein it is essential to employ a highly efficient cell with respect to light sensitiveness and current output. Other uses to which my invention may be applied are the photographic recording and reproduction of sounds, direct reading photometry, actuating electrical circuits by variations in light falling on the photo voltaic cell.

In order that my invention may be properly understood, it is necessary to point out that the generic term "photo electric" or "light sensitive" or "photo sensitive" cell includes several types of cells differing widely not only in construction but in theory of operation.

The well known selenium cell is a resistance which varies with the impressed light.

The "photo electric" cell, consisting of two elements in a highly evacuated chamber, operates by reason of electron flow from an alkali metal or its corresponding hydride or oxide, the change in the rate of flow being proportional to the impressed light within certain limits. The theory of operation is much the same as that relating to the flow of electrons from the filament to the plate in the ordinary two or three element vacuum tube.

Another class of light sensitive cell is that in which a filament, a plate and a collector are sealed in an evacuated vessel, the plate being made photo sensitive. An example of this construction would be an ordinary three element vacuum tube having the plate coated with a suitable metal oxide; here the grid would function as a collector of photo electrons and not as a modulator. In this type of cell electrons are disassociated from the metal plate by electronic bombardment from the filament, the photo electron emission from the plate being proportional to the amount of light falling thereon, and the collector acting as one terminal of the photo electric circuit.

My invention does not belong to any of the foregoing types of photo sensitive cells but utilizes the Becquerel effect produced by light falling upon an electrode immersed in a suitable electrolyte. In this cell the chemical action is accelerated in the presence of light and therefore any chemical action which is accelerated in the presence of light may be used to bring about this result. A cell of this type I have designated as a "photo voltaic" cell.

While the Becquerel effect has been known for many years and while many attempts have been made to utilize this in the commercial production of light sensitive cells, the physical proportions of the cell, the construction necessary to produce a rigid commercial structure that would withstand handling and use, and the various combinations of electrolyte and electrodes to produce a commercially usable device have not heretofore been known. Cells heretofore using this effect have been merely laboratory experiments incapable of commercial use.

Accordingly I herein disclose a new and useful combination of elements constituting a commercial form of cell that can be easily and cheaply produced in large quantities and which utilizes the Becquerel effect in a manner many times more efficient than heretofore.

My improved photo voltaic cell comprises in general a container which is preferably a transparent glass tube or bulb containing two equally spaced metal plates with terminals brought out in a base of insulating material. Before the tube is sealed off, it is filled with a suitable electrolyte.

A modified form of my invention is illustrated in Figures 6, 7, 8 and 9 wherein is shown in addition to the above features, a "grid" made of a plurality of convolutions of wire upon a support and affixed between the metal plates. The primary object of this grid is to secure control of the potential as generated in the photo voltaic cell when exposed to a source of light, thus making the cell applicable for other purposes well known to those familiar with the art.

Referring to the drawings, the numeral 1 designates a transparent glass envelope. Various kinds of glass may be used and different types of glass will give different results, for instance, lead glass being much more opaque to the higher light radiations, will invariably produce a cell less sensitive because less actinic light can pass it; lime glass will produce a cell of greater sensitivity and resulting greater current output because it is much more transparent than is lead glass. This is also the case with "Pyrex" glass, and particularly is the case with quartz. In other words, the more transparent the glass to higher light radiations, the more efficient will the cell be. Since quartz is so expensive, a cell may be constructed with a cheaper grade of glass having sealed therein a window of quartz of suitable size and shape; the sealing between the poorer grade of glass and the quartz window being done by means of graded glasses and fluxes to facilitate this sealing between the higher sealing glass to the lower sealing glass.

The transparent glass envelope designated as 1 in the drawings for best results should have all its surface painted over except such portions as serve as windows to admit light to the metal plates. The paint employed for this purpose may be of such material as to filter off the unwanted rays which, of course, adds to the all-around efficiency of the cell.

In the preferred form of my invention, all the metal parts are the same metal, e. g., copper; other metals may be used, such as nickel, platinum, gold, silver, etc., with various films of oxides and the halides thereof.

I find good results are secured by means of the foregoing mechanical construction, using copper plates the surfaces at least of which I convert to cuprous oxide, and insert in an electrolyte of copper sulphate, potassium chloride, or potassium sulphate.

Prior to forming the cuprous oxide film by any well known process, I first clean the copper plate in any common manner, as by means of boiling it in water, with a little alkali in it, or steeping the plate in a strong nitric acid solution, thereafter washing in running water to free the copper plate from free acid or alkali or reaction products formed on the plates during the cleaning process.

By way of illustrating my invention in detail I shall now describe the same as embodied in a device suitable for many uses where a light sensitive or "photo sensitive" cell is used, reference being made to the accompanying drawings in which:

Figure 1 is a front view of a cell embodying my invention looking at the surface of the plates or electrodes, with a portion of the glass container or envelope broken away to show the interior construction:

Figure 2 is a side view of the cell, Figure 1;

Figure 3 is a sectional view of Figure 1;

Figure 4 is a sectional view on the line 4, 4, Figure 1;

Figure 5 is a sectional view on the line 5, 5, Figure 3;

Figure 6 is a sectional view of a modified form of the cell, Figure 1; containing a "grid" element and with one of the plates or electrodes removed to show the "grid";

Figure 7 is a sectional view on the line 7, 7, of Fig. 6;

Figure 8 is a sectional view on the line 8, 8, Fig. 6;

Figure 9 is a bottom view showing the terminals of the cell, Figure 6.

The numeral 1 designates a transparent glass envelope which may be of any size, shape and form having a re-entrant stem 10a and two glass tubes 2 and 2a, into which are sealed two wires 7 and 7a. These wires may be of platinum, "copper clad", "dumet" or other similar wires. The principal supports or side rods 6 and 9 for the copper plates 5 and 5a are made of large gauge wire which support the insulators or cross members 4 and 4a being secured thereto by wires 14. The assembly comprising the support 6 and 9 and the insulators 4 and 4a (preferably of glass) form a frame to which is fastened the metal plates or electrodes 5 and 5a, held in position by means of the wire hooks 15 supported in the insulators 4, 4a, the set of hooks for one plate being out of contact with those of the other plate. These hooks may be sealed in the insulators. Electrical contact is established to the metal plates 5 and 5a by means of the wires 7 and 7a which pass through the glass rods 2 and 2a through the re-entrant stem 10a and terminate in the base 3 at the terminals or plugs 7' 7''.

The plate assembly containing the plates or electrodes properly and rigidly spaced apart the required distance includes a frame composed of supports 6, 9 and insulators 4, 4a. This is secured within the container or envelope 1 by providing the adjustable clamp member 8 attached to supports 6, 9, which clamp is secured to the re-entrant stem 10a in any suitable manner, such as by bolt 10 and nut 11. This assembly may be further stiffened by providing the stiffening rod or extension $a$ mounted upon the stem 10a and passing through insulator 4 into insulator 4a. This tends to prevent vibration of the assembly within the container and also enables the space $a'$ between the edges of the insulators and plates and the wall of the container 1 to be more accurately maintained.

In the modified type of cell illustrated in Figures 6, 7, 8 and 9 I employ a third electrode, grid or control element 13. This grid element is made of a plurality of convolutions of wire one end of which terminates in a glass bead which is fused to the insulator support 4a. The other end of said grid element passes through a glass bead which is fused to the insulator support 4 and continue through insulator support 4 and glass rod 2b, terminating in the base 3 at the plug or terminal 13a.

The characteristics of my voltaic cell can be varied by spacing of the metal plates 5 and 5a. The closer together the metal plates 5 and 5a, the lower will be the internal resistance of the photo voltaic cell. For cells requiring a high internal resistance the metal plates 5 and 5a may have a greater separation, which can be obtained by using insulator supports 4 and 4a of a greater width. The internal resistance of the photo voltaic cell may also be changed by using an electrolyte of higher or lower concentration.

I electrolyze the cleaned copper plates 5 and 5a in a 10 per cent sodium chloride (salt) solution only for a few minutes, and to these cleaned copper plates is attached a conductor thereby electrically connecting them together. The plates are then connected to the cathode of a source of direct current, and a copper anode, connected with the source of direct current is also placed in the solution. I find that the best electrolyzing potential is between 2 and 10 volts, and 3 to 10 amperes per square decimeter. I now form on the copper plate a homogenous film of cupric chloride, I now remove this copper plate from the salt solution and place it in hot water, hydrolyzing the cupric chloride to form cuprous chloride which in turn is hydrolized to form cuprous oxide, the most sensitive form of element for the photo voltaic cell.

It is obvious, that a plurality of cleaned plates may be electrolyzed at one time so as to obtain plates that under the same conditions, will give the same results.

The copper plates with the film of cuprous oxide are now assembled as shown in the drawings, and the transparent bulb or envelope is filled with a solution 12 of any of the following electrolytes, copper sulphate, potassium chloride or potassium sulphate. The bulb is now sealed off, and it is ready for use.

By exposing the two electrodes to a source of light and causing the light which falls upon one of the electrodes to vary in frequency from that which falls upon the other the resultant current is a component of the currents that would be produced by exciting both electrodes with light of the same frequency.

Obviously I may employ two sources of light of different frequencies and the resultant current obtained from the cell will be modulated accordingly and will be a component of the currents that would be produced by each frequency alone.

By using both plates and the grid I obtain another and different combination of results and by impressing by any known means a suitable potential on the grid, I can vary the character of the current obtained from the cell within wide limits both as to current, potential and frequency.

As the circuits employed to obtained these results are well known and may be any of those employed in connection with vacuum tubes, amplifiers and the like, I do not describe the same in detail.

It is to be understood that the invention is not limited to the precise construction set forth but that it includes within its purview whatever changes fairly come within either the terms or the spirit of the appended claims.

Having described my invention, what I claim is:

1. A photo voltaic cell comprising two metal electrodes, equally spaced, a wire grid interposed between the two metal electrodes, said wire grid and two metal electrodes in contact with an electrolyte in a sealed transparent glass envelope.

2. A photo voltaic cell comprising two metal electrodes spaced apart by means of insulating material, a wire grid interposed between and insulated from the said electrodes having electric conductors brought out through a base, said base supporting a glass envelope filled with a normal solution of copper sulphate, and said metal plates and wire grid being immersed in said solution.

3. A photo voltaic cell comprising two electrodes spaced apart by means of insulating material and one of said electrodes comprising a coating of cuprous oxide, a grid interposed between and insulated from the said electrodes having electric conductors brought out through a base, said base supporting a glass envelope filled with a solution of copper sulphate, and said metal plates and grid being immersed in said solution.

4. In a photo voltaic cell, an electrode supporting structure comprising a pair of longitudinal metallic members, lateral insulating members carried by said longitudinal members, electrodes supported by said lateral members, a third electrode supported thereby and electrolyte in contact with said electrodes.

5. In a photo voltaic cell, an electrode supporting structure comprising a pair of longitudinal metallic members, lateral insulating members carried by said longitudinal members, electrodes supported by said lateral members, a third electrode supported between said first electrodes, and electrolyte in contact with said electrodes.

6. In a photo voltaic cell comprising an envelope containing a pair of electrodes immersed in electrolyte, a modulating element disposed between adjacent surfaces of the electrodes.

7. In a photo voltaic cell comprising a sealed envelope containing a pair of electrodes in contact with electrolyte, a modulating element adjacent said electrodes, and circuit connections from said electrodes and element leading outside said envelope.

Signed at New York in the county of New York and State of New York this thirtieth day of July, A. D. 1928.

SAMUEL WEIN.